(12) United States Patent
Sundhar

(10) Patent No.: US 6,829,243 B1
(45) Date of Patent: Dec. 7, 2004

(54) DIRECTORY ASSISTANCE FOR IP TELEPHONE SUBSCRIBERS

(75) Inventor: Banumathy K. Sundhar, Cary, NC (US)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/318,883

(22) Filed: May 26, 1999

(51) Int. Cl.$^7$ .............................................. H04L 12/56
(52) U.S. Cl. ................ 370/401; 379/88.13; 379/88.17; 379/88.18; 379/88.19
(58) Field of Search ................................ 370/259, 401; 379/88.13, 88.17, 88.18, 88.19

(56) References Cited

U.S. PATENT DOCUMENTS

| | | | | |
|---|---|---|---|---|
| 5,884,032 A | * | 3/1999 | Bateman et al. ............ | 370/356 |
| 5,946,684 A | * | 8/1999 | Lund ........................... | 370/384 |
| 6,104,789 A | * | 8/2000 | Lund ........................ | 379/93.23 |
| 6,141,341 A | * | 10/2000 | Jones et al. ................. | 370/352 |
| 6,192,050 B1 | * | 2/2001 | Stovall ........................ | 370/352 |
| 6,311,231 B1 | * | 10/2001 | Bateman et al. ........ | 379/210.01 |
| 6,320,946 B1 | * | 11/2001 | Enzmann et al. ........... | 379/143 |
| 6,415,027 B1 | * | 7/2002 | Malik ..................... | 379/221.01 |

* cited by examiner

Primary Examiner—Hassan Kizou
Assistant Examiner—Dmitry Levitan
(74) Attorney, Agent, or Firm—Hunton & Williams LLP (57) ABSTRACT

Directory assistance (DA) information is provided by a telephone system to internet protocol (IP) client telephones in selectable formats including: a text data format provided jointly with an aural format in response to an aural request from the client and, alternately, in text data format in response to a text message request from the client.

18 Claims, 6 Drawing Sheets

DIRECTORY ASSISTANCE FOR IP TELEPHONE SUBSCRIBERS

TECHNICAL FIELD

This invention relates to internet protocol (IP) networks, and more particularly to providing directory assistance (DA) services to IP network subscribers.

BACKGROUND ART

As known, internet protocol (IP) telephones are typically personal computer (PC) based telephones connected within an IP network, such as the public internet or a private network of a large organization. These IP telephones have installed "voice-over-IP" (VoIP) software enabling them to make and receive voice calls as well as send and receive information in data and video formats. IP telephony switches installed within the IP network enable voice calls to be made within or between IP networks, and between an IP network and a switched circuit network (SCN), such as the public switched telephone network (PSTN). If the IP switch supports the Signaling System 7 (SS7) protocol, the IP telephone can also access PSTN data bases.

As also known, subscribers to the PSTN have access to certain fee-based telephone services provided by the local telephone switching company. These include directory assistance ("DA"), which allow a caller to request operator assistance in obtaining a directory number ("DN"). Rather than dialing "0" to access the local operator the caller dials either: 411, 1-555-1212, or 1-NPA-555-1212 (where NPA is the Numbering Plan Area, or area code) and the call is presented to an operator on a screen that immediately identifies the call as a DA call. The operator obtains the DA search query information from the subscriber and initiates a DA database search. The DA database returns all listings that match the search criteria. The operator then selects the appropriate listing and releases the call to an audio response unit (ARU) that provides the subscriber with an audible report of the requested number.

The DA service is provided at a fee by the service provider and is an important revenue source. Similarly, the service is a significant value added feature to the subscriber when time or circumstance prevent the caller from determining the requested number on their own. Despite the benefits to both service provider and subscriber the DA service does have limitations for both parties. For the subscriber the reported telephone number is provided as an audible response. Although the reported number is repeated to give the caller the opportunity to either memorize or record it, the information is generally "jotted down" in a temporary way; sufficient only to make the present call. The failure to record the information in a permanent way, such as in a subscriber's telephone personal directory, typically results in the need to again access the DA service the next time the call must be made.

Since the DA service is a revenue source for the service provider the repeat access by a subscriber may well be considered a positive result. However, there are efficiencies with providing the DA service which are important to profitability. Since the subscriber calling the DA service operator does not necessarily have detailed information as to the residence, or even the locale of the party at the requested number, there is dialogue that must occur with the subscriber to allow the DA operator to narrow the search command to the DA database. For providers of telephone services in large metropolitan areas, this dialogue time can be significant, resulting in a corresponding amount of operator time to complete the transaction. As such, some service providers have begun use of automated operator technology in which a subscriber accesses a computer generated voice response menu and enters information via the telephone keypad. While this becomes a greater burden to the subscriber, it reduces the service providers real-time cost of providing real-time operators.

It would be desirable, therefore, to provide a means to more efficiently report DA service information to a subscriber in a manner that reduces the amount of time spent by both parties to the transaction.

DISCLOSURE OF INVENTION

The present invention is to method and apparatus for providing PSTN directory assistance (DA) services to internet protocol (IP) client telephones having voice over internet protocol (VoIP) capabilities. According to the invention the PSTN local switching system is modified to recognize an IP client telephone as a basic rate interface (BRI) agent to allow the IP client telephone to access the system's DA services and to receive DA information in data form as well as voice form.

In further accord with the invention, the DA service is provided with an IP signal gateway connection to the client network, such as the public internet, and the response to an IP client request for DA information is reported to the IP client in data format through the gateway. In still further accord with the invention, when an IP client dials the DA service, the local switch identifies the DA request as coming from a IP client and commands the DA to send the DA requested information to the client by audible response through the PSTN as well as in data format through the IP gateway. In still further accord with the invention the requested DA information provided includes the party name, telephone number, and listed address, which are provided in a data format that the IP client can receive and store in a personal database installed on the IP telephone.

The advantage of the expanded service to the IP telephone client is the automatic record of the directory information stored directly in the IP telephone. This is performed automatically, without the need of the caller to transcribe or otherwise record the verbal information into an address book. By recognizing the IP telephone as a BRI agent at the local switch, the present invention does not require any major modifications to the local switching system software since the BRI features are already supported by the switching system software. In executing this expanded service, the local switch can provide the data information using available Integrated Subscriber Digital Network (ISDN) BRI available message formats, such as a facility message. Since the facility message is sent over the data channel it does not occupy the voice channel, or prevent use of the voice channel by the DA service.

For the service provider (or Telcos) the enriched value of having the DA information automatically downloaded into the subscriber's local database, may warrant a flat monthly rate that is charged to all subscribers as an overhead cost. By amortizing this cost over all customers the high value DA service is made available to all at a comparatively small charge.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 6:
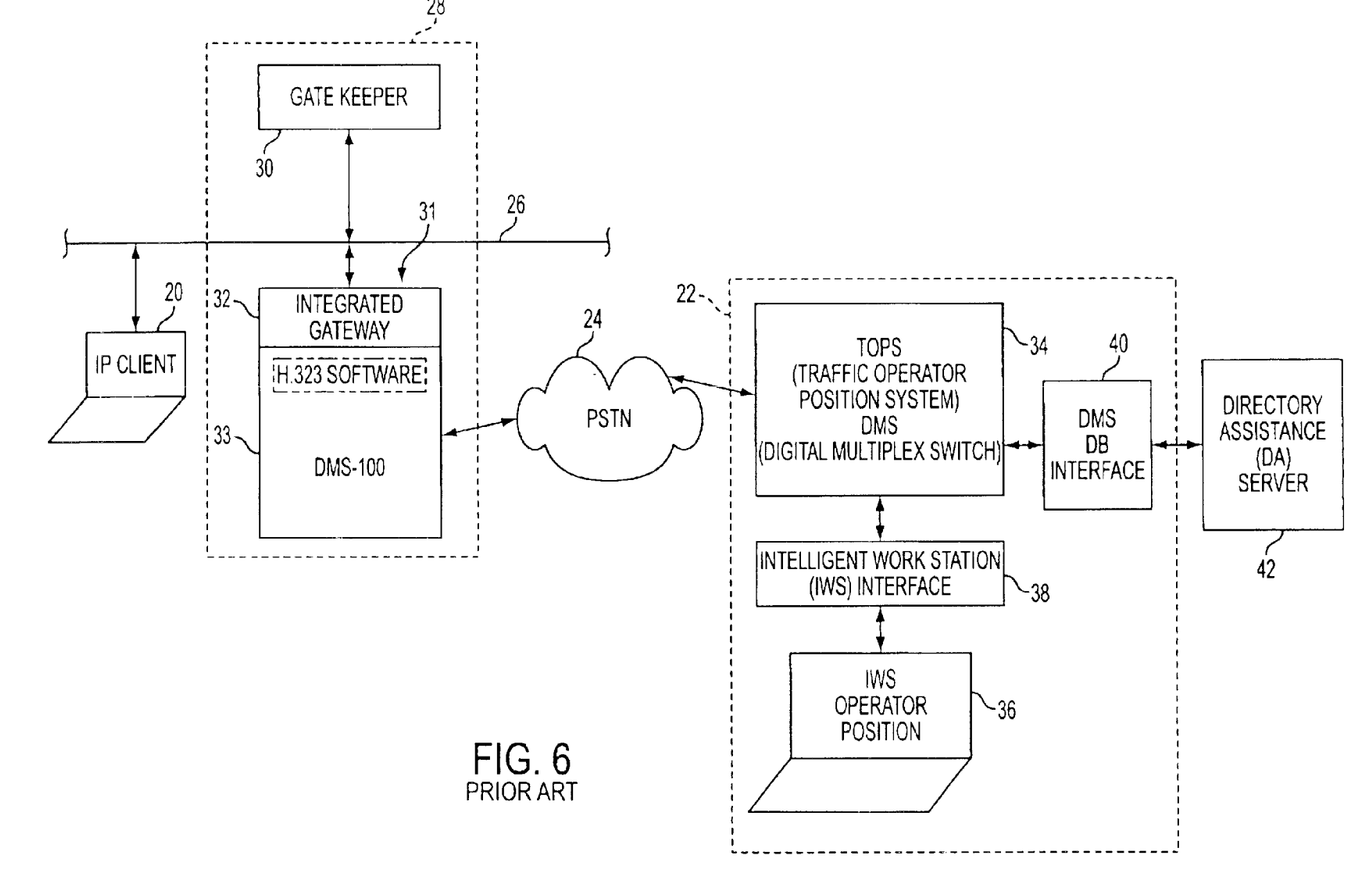
FIG. 6, is a schematic block diagram of a PRIOR ART type user display that may be used in conjunction with the present invention.

Referring first to FIG. 6, which illustrates the prior art interface of an IP telephone 20 to a local switching system 22 of an SCN 24, such as the public switched telephone network (PSTN). The IP telephone 20 is connected to an IP network (or packet based network (PBN)) 26, such as the public internet or a private network of a large organization. The IP telephone 20 is typically a multimedia personal computer (PC) having a microphone, speakers, and installed "voice-over-IP" (VoIP) software that complies with the International Telecommunications Union (ITU) standard H.323; possibly including H.323 Revision 2 ("Packet Based Multimedia Communications Systems").

With the VoIP software the IP telephone PC may send and receive voice messages, as well as sending and receiving information in data and video formats. The network 26 includes a gatekeeper 30 and a local area network LAN) IP gateway 32, which together enable voice communications to be exchanged between the IP telephones 20 and the local switching system 22 through the PSTN 24. The gatekeeper 30 provides the address translation of telephones, the authorization and authentication of terminals and gateways, the management of the IP network bandwidth, and the call accounting, billing, and charging of calls to network subscribers.

The gateway 32 provides the functional interconnect between the H.323 protocol IP network 26 and the PSTN 24. It does this by translating protocols for call setup and release, by converting network media formats, and by transferring information between the connected networks. This includes digitizing and signal compressing the voice calls from the PSTN into IP packets for routing through the network 26, and transmitting call signaling information to the PSTN using, ISDN (Integrated Services Digital Network) D-Channel signaling, or other forms of signaling. The gateway 32 may be a time-division-multiplex switch, such as the Nortel Networks Model DMS-100 digital multiplex switch with installed H.323 VoIP software. The DMS-100 sets up the wireline (or wireless) call connections to the PSTN 24 and to query PSTN database servers, such as the DA server 42. When the IP client telephone 20 is used to make a 411 DA call, the call is routed by the gate keeper 30 through the DMS-100 and the PSTN 24 to the local switching telephone system 22. The call may be routed through the PSTN on any of the known telephone network trunks, such as TOPS, MF, IT, ATC (Access Tandem to Carrier) and ISDN User Part (ISUP).

The local switching system 22 includes a Traffic Operator Position System (TOPS) Digital Multiplex Switch (DMS) 34, such as the Nortel Network Model TOPS DMS-200 central office switch. The switch communicates with the local switching system's intelligent work station (IWS) Operator Position 36 through an IWS interface 38 using an Open Position Protocol (OPP) message format which provides screen displays at the IWS operator position 36. The TOPS DMS-200 also communicates through a DMS/DB interface 40 with the directory assistance (DA) server 42.

Typically the DA server includes a relational database software operating environment, and hardware, including coupled RISC-based UNIX signal processors, that communicate with the TOPS DMS 34 switch via open protocols, and which includes a RISC-based dual-database system which stores telephone listings in a relational database and in a format optimized for search purposes. The IWS Operator Position 36 provides an operator interface to the DA service, and comprises a workstation with a Graphical User Interface (GUI) which provides point-and-click access to administration and update functions for the DA services. The GUI may use multiple windows, with the ability to cut, copy, and paste information from one window to another. The IWS 38 and DA server 42 are configured in a LAN/WAN network supported by the industry-standard TCP/IP protocol.

In the operation of a prior art DA call from the IP telephone 20, also referred to here as an IP Client 20, the caller enters the DA designated number (DN), such as 411, 1-555-1212, or I-NPA-555-1212 (where NPA is the Numbering Plan Area, or area code) and the call is routed by the gateway 30 and DMS-100 through the PSTN 24 to the TOPS DMS 34 of the local switching system 22. The TOPS DMS identifies the call as a DA call on a screen of the IWS Operator Position, and reserves a three port circuit between itself, the IP telephone 20, and the IWS Operator Position 36. The IWS operator requests information from the IP client in the form of the name and city of the party to be called over the reserved three port circuit. The operator keys in this information which is passed to the TOPS DMS in an OPP message protocol. The TOPS DMS establishes a call with the DA system (using standard DA protocol) and passes the operator information to the DA server. The DA server retrieves the requested directory number (DN) and asks the TOPS DMS to connect it to an Automatic Response Unit (ARU) (not shown) and the DA server provides the retrieved DN to the attending ARU. The CM then connects the ARU to the three port conference circuit and the audio response unit is played back to the IP client; typically the response is repeated to provide for sufficient notice. When the playback is complete the TOPS DMS disconnects the call to the DA server into the Automatic Message Accounting (AMA) billing system. The operator position is then released.

The present invention expands the DA services provided to IP telephone clients by additionally providing the DA information in forms, including a data format. In the present invention the IP telephone 20 is provided with the same voice communication protocol and interface through the PSTN 24 to the local switching system 22, however, a data pathway is also provided for transferring the DA information in data format to the IP client telephone 20. The invention is capable of implementation in several embodiments, as will be described in the following figures.

Figure 1:
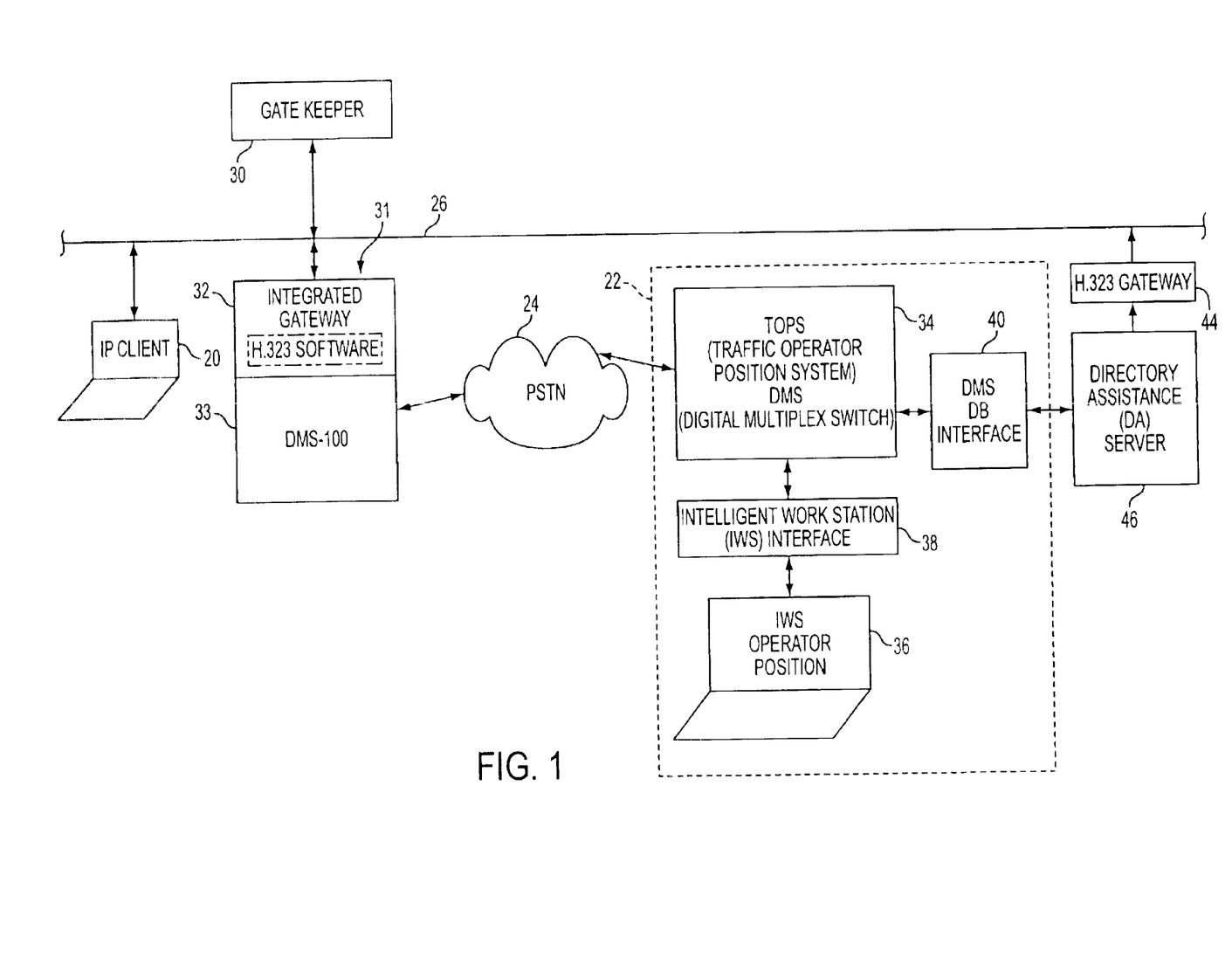
FIG. 1, is a schematic block diagram of a best mode embodiment of the present invention for use in providing directory assistance (DA) services to an IP telephone across an IP network to switched circuit network (SCN) interface.

Referring now to FIG. 1, which repeats the common connection interface between the IP network 26 and local switching system 22 through the PSTN 24, but which farther includes an added H.323 gateway 44 which functionally connects the signal output of a DA server 46 directly to the IP network 26. The gateway 44 is of a known-type, and provides unidirectional signal transmission from the DA server 46, to the IP telephone. In doing this it translates the SCN signal protocol of the system 22 to the packet protocol of the IP network 26. As described hereinafter with respect to FIGS. 2 and 3, the DA server 46 is a variation of the DA server 42 of FIG. 6 to the extent that the server's software is modified as necessary to command and provide the requested DA information in data format to the gateway 44.

Figure 2:
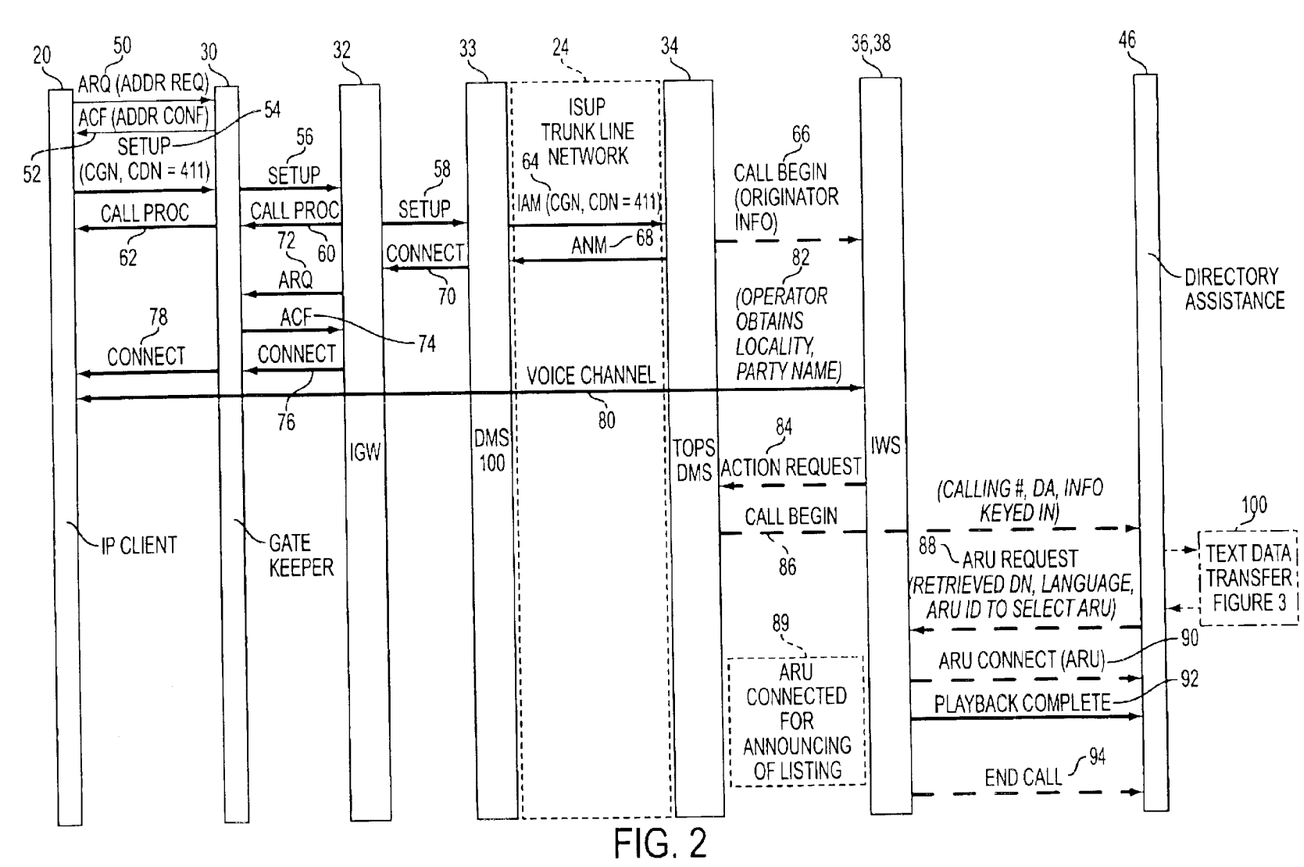
FIG. 2, is a figurative, process flow diagram used in connection with the teaching of the embodiment of FIG. 1.

FIG. 2 is a figurative flow diagram of the sequential steps performed between the IP telephone 20, the IGW 32, the DMS 33, the TOPS DMS 34, the IWS 36, and the DA server 46 in setting up a DA call request from the IP client. Referring simultaneously to FIGS. 1 and 2, when the telephone 20 goes "off hook" it sends an ARQ (address request) 50 to the gate keeper 30 requesting authenticators to make a call and if authorized, the gate keeper returns an ACF by, (address confirm) command 52. The caller at the IP telephone then issues a SETUP command 54 by dialing the directory number for the DA, which is relayed 56 by the gatekeeper to the IGW 32. The IGW forwards the SETUP 58 to the DMS 33 and returns a CALL PROCEEDING notice 60 to the gate keeper, which is relayed 62 to the telephone. The notice may be in the form of a confirmatory tone, or with a ringing audible sound indicating to the caller that the call is proceeding.

When the DMS 100 receives the setup 58 it recognizes the IP telephone as a basic rate interface (BRI) device, and includes that BRI indicator together with the dialed DN in a IAM (Initial Address Message) and sends it across an ISUP trunk to the TOPS DMS 34. The TOPS DMS 34 recognizes the call as a DA request from a BRI device which is capable of receiving information in voice, data, and video format. The TOPS DMS 34 issues a CALL BEGIN command 66, which includes all of the originator information, (i.e. the designated number for the IP telephone 20) to the IWS 36.

Once the CALL BEGINS 66 command is established the TOPS 34 issues an ANM "Answer Message" 68 to the DMS 33, which responds by issuing a CONNECT COMMAND 70 to the IGW 32. The IGW sends an admissions request (ARQ) 72 to the gatekeeper 30, which confirms the request with a response ACF 74. The IGW then issues a CONNECT command 76 which is relayed 78 by the gatekeeper to the IP client 20 to establish the voice channel 80 between the telephone 20 and the IWS 36.

With a voice channel established the operator obtains information from the caller identifying the locality and party name for which the caller wishes directory assistance. Once the information has been obtained the operator issues an ACTION REQUEST 84 from the IWS to the TOPS 34 to command access to the DA server 46. The TOPS 34 forwards a CALL BEGIN command 86 to the DA server 46. This CALL BEGIN includes: the calling number of the telephone 20 and the information that has been keyed in by the operator, and it commands the DA server 46 to perform a directory search for the requested information. The search is performed and the search results, in the form of the a directory number are included in an ARU Request 88 issued by the DA server 46 to the IWS 36. This request includes the connection 89 of an audio response unit to receive and to provide an audible announcement over the voice channel 80 to the IP telephone 20. The IWS provides an ARU connect 90 and when the playback has been completed the IWS issues a Playback Complete command 92 to the DA, followed by an END CALL command 94.

The sequence described thus far is similar to the prior art DA process in providing an audio response to the caller. In the present invention, following the CALL BEGIN 86, the DA server 46 performs a collateral text data transfer routine 100 for providing the same DA search results in text data format through the gateway 44 to the IP telephone 20.

Figure 3:
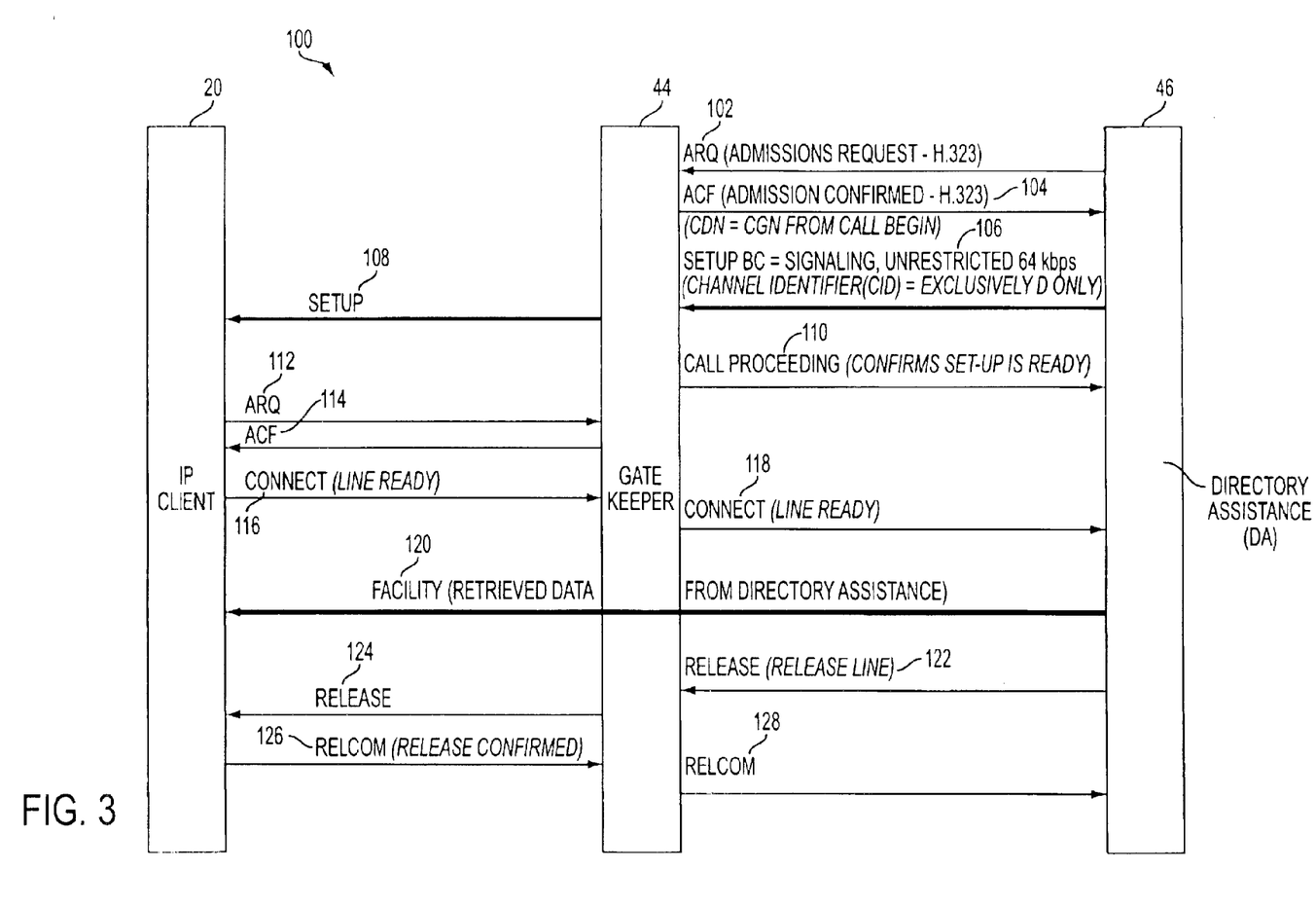
FIG. 3, is another figurative, process flow diagram used in conjunction with the diagram of FIG. 2.

Referring now to FIG. 3, which illustrates the setup command exchange and release associated with the routine 100. This begins following the CALL BEGIN 86 (FIG. 2) with an ARQ request 102 in H.323 format from the DA server 46 to the gateway 44. The gateway 44 confirms with a responding ACF confirmation 104. The DA server 46 then issues a SETUP 106 to the gateway 44. The setup requests the channel signaling and an unrestricted 64 kbps data channel. The set passes the SETUP COMMAND 108 to the IP client telephone 20 and then confirms the setup with a CALL PROCEEDING COMMAND 110 back to the DA server 46.

Before responding to the SETUP 108 the IP client 20 issues an ARQ 112 to the gateway 44, which responds with a ACF 114, and the IP client sends a CONNECT notice 116 to the gate keeper 44 indicating that it is ready to receive data. This CONNECT notice relayed 118 to the DA server, which then forwards a FACILITY MESSAGE containing the retrieved DA information to the gate keeper 44 and the IP client telephone 20. When the transmission is complete the server 46 issues a RELEASE COMMAND 122 to the gateway which relays the request 124 to the IP client. The IP client responds with a RELCOM (Release Confirmed) acknowledgment 126 to the keeper 44, which is relayed 128 back to the DA server.

In the above described embodiment the gate keeper 44 provides a firewall connection between the DA server 46 and the IP network 26. The gateway establishes an H.323 session with the IP telephone client 20 and sends the retrieved DA information in data text format directly to the telephone's PC. The data is unformated, i.e. without control characters, such that when received it may appear as:

3055551234miamifloridajanesanders

This information may be loaded by the IP telephone into client installed address book software which formats the text data into readable format as:

(305) 555-1234

Miami, Fla.

Jane Sanders

Figure 4:
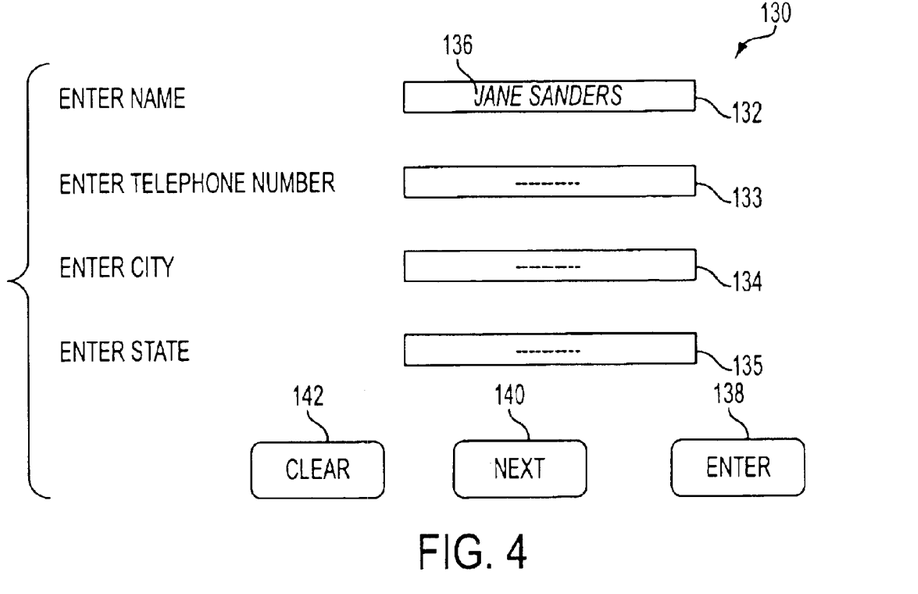
FIG. 4, is an illustration of one operating state of one type of user graphic display that may be used with the present invention.
Figure 5:
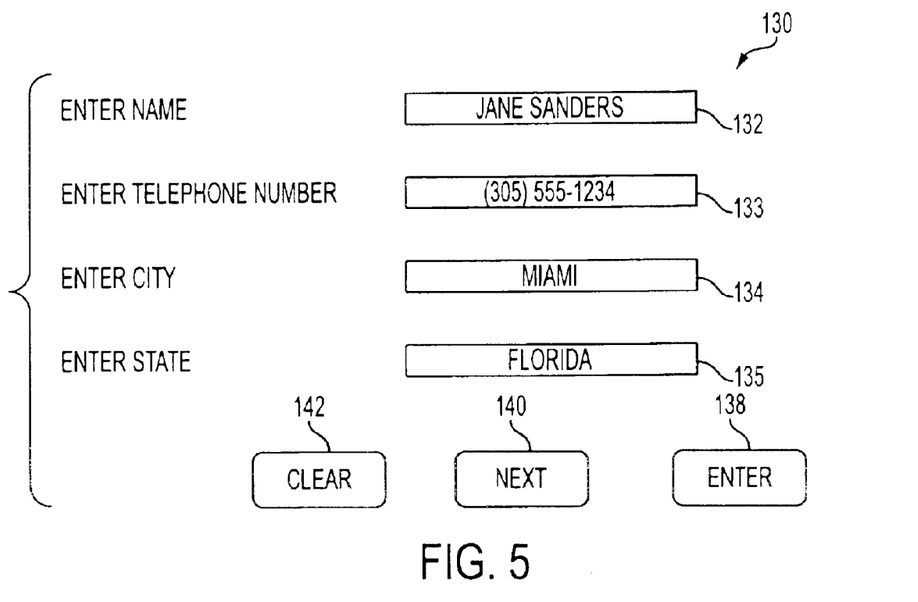
FIG. 5, is an illustration of another operating state of the graphic display of FIG. 4.

Once stored the information can be retrieved locally from the telephone address book by searching the entries. FIG. 4 is an illustrative diagram of one of a number of possible Graphical User Interface (GUI) displays 130 having four fields 132–135, including Name, Telephone Number, City, and State. The user may enter the name "Jane Sanders" 136 and hit the "ENTER" key 138 to begin the search. The retrieved information is shown in FIG. 5 to include the data formatted information forwarded from the DA server 46. If multiple sets of information are retrieved for the same search criteria the user can use the NEXT key 140 to scroll through the results. Similarly, the CLEAR key 142 clears the display fields.

The data formatted DA information may also be transmitted to the IP client telephone in various other embodiments. A modification of the above described embodiment would be to have the gateway 44 be capable of being directly dialed up by the IP telephone 20. This would allow direct access by the telephone 20 to the DA server and allow searching of the server in a protocol similar to database searching routines, i.e. direct access by the client caller to the listing database. This would avoid the need for a voice call through the PSTN and could be subject to a transaction or subscription based fee scale.

Figure 7:
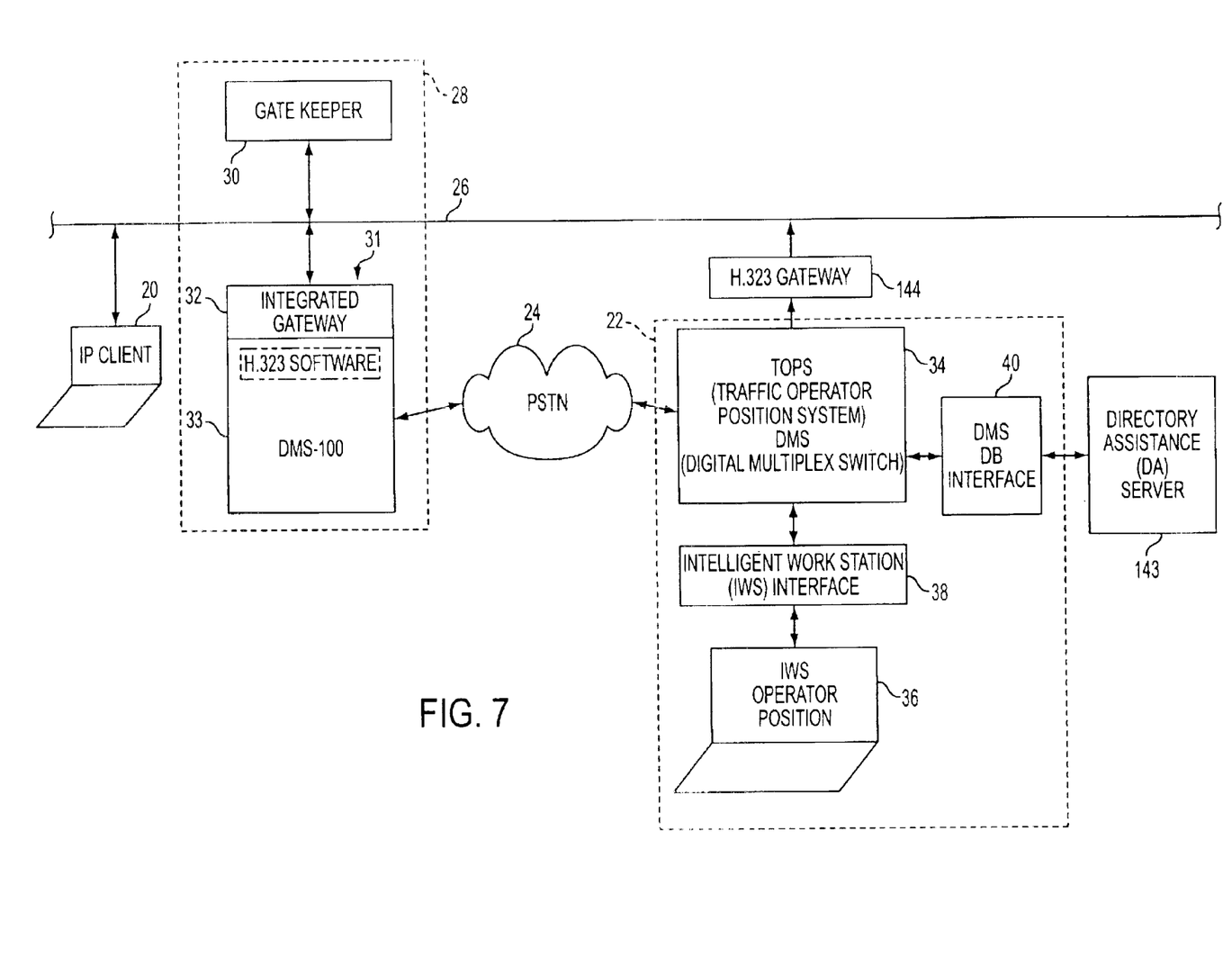
FIG. 7 is a schematic block diagram of an alternative embodiment of the invention.

FIG. 7 illustrates a further embodiment in which the H.323 gateway 130 is instead connected to an input/output (I/O) port of the TOPS TMS 34. In this embodiment the TOP TMS establishes a H.323 session with the IP client telephone and passes the retrieved DA information in H.323 message format to the IP client. This involves some modification of the operating software of the TOPS COMPUTING MODULE (CM).

The expanded DA services to the IP client telephone can also be provided with no hardware modifications of the local switching system 22, by having the TOPS DMS 34 forward the retrieved DA information through the PSTN 24 to the DMS 33 in the TCAP transaction message function of the Signaling System 7 protocol. The DMS 33 would then convert the TCAP to H.323 message format and send it to the IP client telephone.

The present invention provides an expanded DA service to IP client telephone callers with minimum modification of the existing DA service software. It lends itself to various embodiments, each of which deliver the DA information in a text data format but in a different interface manner. The use of a gateway connection between the DA server and the IP network provides the greatest degree of service expansion in that the text data may be provided in conjunction with a standard audio delivery, or it may be provided as a direct access database in which no voice call is involved. This is a high value added service which is of immediate benefit to both the client and the telephone service provider. In consideration of its high value and in the flexibility of its delivery, the telephone service provider has a variety of options in charging for the service. This may include a flat monthly subscription fee for all subscribers which eliminates the need for AMA transaction billing, reducing both the service cost to the provider as well as the service charge to the customer.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

I claim:

1. A telephone system, for providing directory assistance (DA) services in response to a DA service number received from a calling party telephone having a directory number (DN), the DN identifying the type of calling party telephone, including internet protocol (IP) telephones capable of accessing the telephone system through the public switched telephone network (PSTN) and through the public internet, the system comprising:
   a DA signal processor, having a DA signal memory for, storing the DN of a plurality of party telephones, each DN being stored in said memory in relationship with additional party information; and
   a telephone switch, responsive to receipt of a DA service number, and having a switch signal processor and a switch signal memory for storing program signals, for:
      identifying the type of calling party telephone;
      reporting th requested DA information in voice format to the calling party telephone; and
      additionally forwarding the requested DA information in data file format to the calling party telephone if the calling party telephone is identified as a calling party IP telephone.

2. The telephone system of claim 1, wherein said step of reporting by said telephone switch, comprises:
   connecting the calling party to a DA service operator for receiving the calling party requested information in voice format;
   forwarding the requested information from the operator as a search request to said DA signal processor;
   retrieving the results of said search request from said DA signal processor as a DA information response data file; and
   formulating said DA information response data file in voice format for report to the calling party telephone.

3. The telephone system of claim 2, further comprising:
   a signal gateway, interconnected for response to the telephone system and to the public internet, for;
      receiving said DA information response data file from the telephone system; and
      transmitting said DA information response data file through the public internet to the calling party IP telephone.

4. The telephone system of claim 3, wherein said signal gateway receives said DA information response data file from said DA signal processor.

5. The telephone system of claim 3, wherein said signal gateway receives said DA information response data file from said switch signal processor.

6. The telephone system of claim 2, further comprising:
   a signal gateway, interconnected for response to said DA signal processor and to the public internet, for:
      receiving signal requests for DA services which are forwarded through the public internet from an IP telephone in an internet protocol (IP) data file format, and translating as necessary, the IP data file format to the telephone system operating protocol;
      forwarding the signal request for DA services to said DA signal processor and retrieving said DA information response data file therefrom and translating, as necessary, said DA information response data file to an IP format DA information response data file; and
      forwarding said IP format DA information response data file through the public internet to the IP telephone.

7. A telephone system of the type having a switched circuit network (SCN) signal protocol which provides directory assistance (DA) services in response to a DA service number received from a calling party telephone having a directory number (DN), the DN identifying the type of calling parry telephone, including switched circuit network (SCN) telephones and internet protocol (IP) telephones, the IP telephones being capable of accessing the telephone system through the public switched telephone network (PSTN) and through the public internet, the system comprising:
   a signal gateway, interconnected for response to the telephone system and to the public internet;
   a DA signal processor, having a DA signal memory for storing the DN of a plurality of party telephones, each DN being stored in said DA signal memory in relationship with additional party information;
   a telephone switch, responsive to receipt of a DA service number, and having a switch signal processor and a switch signal memory for storing program signals, for:
      identifying the type of calling parry telephone;
      connecting the calling party to a DA service operator for receiving calling party requested information in voice format;
      forwarding the requested information from the operator as a search request to said DA signal processor;

retrieving the results of said search request from said DA signal processor as a DA information response data file, and for providing formulation thereof in voice format for report to the calling party telephone; and reporting the requested DA information in voice format to the calling party telephone;

and wherein said DA signal processor provides for:
receiving said search request from said switch signal processor;
providing said DA information response data file to said switch signal processor in response thereto; and
forwarding said DA information response data file to said signal gateway for transmittal to the calling party telephone through the public internet if the calling party telephone is identified as a calling party IP telephone.

8. The telephone system of claim 7, wherein said signal gateway receives said DA information response data file from said DA signal processor.

9. The telephone system of claim 7, wherein said signal gateway receives said DA information response data file from said switch signal processor.

10. The telephone system of claim 7, wherein said signal gateway is interconnected for response to said DA signal processor and to the public internet, for;
receiving signal requests for DA services which are forwarded through the public internet from an IP telephone in an Internet protocol (IP) data file format, and translating the IP data file format to the telephone system SCN operating protocol;
forwarding the signal request for DA services to said DA signal processor and retrieving said DA information response data file therefrom;
providing translation of said DA information response data file from an SCN protocol to an IP format DA information response data file; and
transmitting said IP format DA information response data file through the public internet to the IP telephone.

11. A method of providing directory assistance (DA) services from a telephone system in response to a DA service number received from a calling party telephone having a directory number (DN), the DN identifying the type of calling party telephone, including internee protocol (IP) telephones capable of accessing the telephone system through the public switched telephone network (PSTN) and through the public internet, the telephone system having a switch signal processor, a DA signal processor, and a DA signal memory for storing the DN of a plurality of party telephones, each DN being stored in said DA signal memory in relationship with additional party information; the method comprising:
connecting a signal gateway between the telephone system and the public internee;
having the switch signal processor receive the DA service number and provide for:
receiving the DA service number and identifying the type of calling party telephone;
reporting requested DA information in voice format to the calling party telephone; and
additionally forwarding the requested DA information in data file format to said signal gateway for transmittal through the public internet to the calling party telephone if the calling party telephone is identified as a calling party IP telephone.

12. The method of claim 11, wherein said step of reporting by said switch signal processor, comprises:
connecting the calling party to a DA service operator for receiving the calling party requested information in voice format;
forwarding the requested information from the operator as a search request to the DA signal processor;
retrieving the results of said search request from said DA signal processor as a DA information response data file; and
formulating said DA information response data file in voice format for report to the calling party telephone.

13. The method of claim 11, wherein said signal gateway receives said DA information response data file from the DA signal processor.

14. The method of claim 11, wherein said signal gateway receives said DA information response data file from the switch signal processor.

15. The method of claim 11, wherein said signal gateway further provides for;
receiving internet signal requests for DA services through the public internet from an IP telephone in an internet protocol (IP) data file format, and, as necessary, translating the IP data file format to the telephone system operating protocol;
forwarding the internet signal request for DA services to the DA signal processor and retrieving said DA information response data file therefrom;
translating, as necessary, said DA information response data file to an IP format DA information response data file; and
transmitting said IP format DA information response data file through the public internet to the IP telephone.

16. A method of providing directory assistance (DA) services from a DA server of a telephone switching system to an internet protocol (IP) telephone located in an IP network, che IP network being of the type having an IP gateway capable of connecting the IP telephone to the telephone switching system, the method comprising:
adding a signal gateway to the telephone switching system, said signal gateway being capable of transferring information in data format from the telephone system to the IP network;
causing the telephone switching system to recognize the IP telephone as an interface device capable of receiving information in voice and data format;
having the telephone switching system, in response to each IP telephone request for DA information received thereby, command the DA server to provide the requested DA information in voice format through said telephone switching system to the IP telephone; and
additionally having the telephone switching system, in response to each IP telephone request for DA information received thereby, command the DA server to provide the requested DA information in data format through said signal gateway and the IP network to the IP telephone.

17. The method of claim 16, further comprising:
connecting a DA server data signal output to said signal gateway.

18. The method of claim 16, wherein said signal gateway receives the requested DA information in data format from said telephone switching system.

* * * * *